(12) United States Patent
Meuleman (10) Patent No.: US 10,426,687 B2
(45) Date of Patent: Oct. 1, 2019

(54) MECHANICAL LINKAGE

(71) Applicant: MOOG BV, Nieuw-Vennep (NL)

(72) Inventor: Jos Meuleman, Bennebroek (NL)

(73) Assignee: Moog BV, Nieuw-Vennep (NL)

(*) Notice: Subject to any disclaimer, the term of this patent is extended or adjusted under 35 U.S.C. 154(b) by 1034 days.

(21) Appl. No.: 14/781,920

(22) PCT Filed: Mar. 28, 2014

(86) PCT No.: PCT/EP2014/056368
§ 371 (c)(1),
(2) Date: Oct. 2, 2015

(87) PCT Pub. No.: WO2014/161797
PCT Pub. Date: Oct. 9, 2014

(65) Prior Publication Data
US 2016/0030268 A1 Feb. 4, 2016

(30) Foreign Application Priority Data

Apr. 3, 2013 (GB) .................................. 1305984.5

(51) Int. Cl.
*A61H 1/02* (2006.01)
*A61H 3/00* (2006.01)
*F16H 21/32* (2006.01)

(52) U.S. Cl.
CPC ......... *A61H 1/0266* (2013.01); *A61H 1/0244* (2013.01); *A61H 3/00* (2013.01); *F16H 21/32* (2013.01); *A61H 2001/0207* (2013.01); *A61H 2201/1454* (2013.01); *A61H 2201/163* (2013.01); *A61H 2201/165* (2013.01); *A61H 2201/1642* (2013.01)

(58) Field of Classification Search
CPC .. A61H 3/00; A61H 1/0266; A61H 2201/165; A61F 5/0111; A61F 5/0127; A61F 5/0102; A61F 2005/0132; A61F 2005/0137; A61F 2005/0141; A61F 2005/0144; A61F 2005/0155
See application file for complete search history.

(56) References Cited

U.S. PATENT DOCUMENTS

| | | | | |
|---|---|---|---|---|
| 2,267,848 A | * | 12/1941 | Taylor | A61F 5/0102 602/16 |
| 2,567,195 A | * | 9/1951 | Ellery | A61F 5/0127 602/28 |
| 3,086,521 A | * | 4/1963 | Desai | A61F 5/0127 602/16 |
| 4,064,874 A | * | 12/1977 | Valin | A61F 5/0123 2/22 |
| 4,144,881 A | * | 3/1979 | Chappell | A61F 2/30 602/16 |

(Continued)

FOREIGN PATENT DOCUMENTS

| | | |
|---|---|---|
| CN | 101006958 | 8/2007 |
| GB | 2464147 | 4/2010 |
| WO | 2007147232 | 12/2007 |

*Primary Examiner* — Justine R Yu
*Assistant Examiner* — Christopher E Miller
(74) *Attorney, Agent, or Firm* — Hodgson Russ LLP (57) ABSTRACT

A linkage (100, 200) having a plurality of small angle links (114, 116; 208, 212) with axes of rotation directed to a single point to allow movement of an recipient object without moving the point of action of an applied force (F).

11 Claims, 8 Drawing Sheets

(56) References Cited

U.S. PATENT DOCUMENTS

| | | | | |
|---|---|---|---|---|
| 5,417,643 | A * | 5/1995 | Taylor | A61H 1/0274 601/24 |
| 6,301,526 | B1 * | 10/2001 | Kim | B25J 9/0006 600/1 |
| 8,347,710 | B2 * | 1/2013 | Scott | A61B 5/1038 414/2 |
| 8,801,639 | B2 * | 8/2014 | Malosio | A61H 1/0274 482/139 |
| 2005/0187505 | A1 * | 8/2005 | Carlson | A61F 5/0125 602/23 |
| 2007/0049858 | A1 * | 3/2007 | Agrawal | A61F 5/0127 602/27 |
| 2007/0123997 | A1 * | 5/2007 | Herr | A61F 2/60 623/27 |
| 2007/0225620 | A1 * | 9/2007 | Carignan | A61H 1/0281 601/5 |
| 2008/0304935 | A1 * | 12/2008 | Scott | A61B 5/1038 414/5 |
| 2010/0121233 | A1 * | 5/2010 | Ashihara | A61H 3/008 601/34 |
| 2011/0251533 | A1 * | 10/2011 | Han | A61H 1/0274 601/33 |
| 2012/0172769 | A1 * | 7/2012 | Garrec | A61F 5/013 601/33 |
| 2014/0364783 | A1 * | 12/2014 | Desousa | A61F 5/0102 602/16 |

* cited by examiner

MECHANICAL LINKAGE

CROSS-REFERENCE TO RELATED APPLICATIONS

The present application is the U.S. national phase of International Application No. PCT/EP2014/056368 filed Mar. 28, 2014, which claims priority of British Application No. 1305984.5 filed Apr. 3, 2013, the entirety of which is incorporated herein by reference.

FIELD OF THE INVENTION

The present invention concerns a mechanical linkage. More specifically, the present invention concerns a gimbal-type linkage for the transference of force between two points whilst permitting limited movement of a force recipient in selected degrees of freedom.

BACKGROUND OF THE INVENTION

It is often desirable to transfer a force between an actuator and a recipient in a mechanical system. In particular, it is often desirable to exert the force on a "virtual point" which may not be accessible in reality.

For example in the field of rehabilitation robots for victims of neurological disorders, the actuator needs to be able to provide both actuating and supporting forces to move and support patient limbs. This may be done, for example, by using a rod attached at one end to an actuator, and at the other end to the limb of a subject, such as an arm or leg.

The connection between the rod and the subject's limb may be achieved in several ways. For example, the rod may be rigidly attached to a strap or brace which secures around the limb. This type of connection does not allow any free movement between the rod and limb, and as such movement of the limb in all six degrees of freedom is dependent upon movement of the rod.

This is problematic in rehabilitation. The aim is to progress the subject towards self supporting motion, and allowing some movement is beneficial as the feeling of freedom of movement inspires the subject to exercise control.

A spherical or Cardan joint may be provided between the rod and strap, however this only provides freedom in two rotational degrees of freedom, about the centre of the physical joint. In the event that the force is applied to a joint, for example an ankle, this can be problematic, as once the ankle joint rotates about the spherical joint, the line of direction of force from the rod is no longer coincident with the centre of rotation of the ankle. This is not ideal, as it creates a moment on the ankle which resists movement back to the nominal, aligned position and therefore resists the subject's efforts to correct their gait.

What is required is a connection which allows transmission of a force from an actuator to a recipient, but minimises constraint free rotation of the recipient.

SUMMARY OF THE INVENTION

It is an aim of the present invention to overcome, or at least mitigate the above referenced problems.

According to a first aspect of the invention there is provided an assembly for transferring a force from a force provider to a recipient object, the assembly comprising:
a force provider;
a recipient object;
a linkage configured to transfer a force from the force provider to the recipient object, the linkage comprising a first link and a second link;
the first link having a first rotational joint defining a first link axis, and a second rotational joint defining a second link axis, the first and second link axes being at a first link angle to each other, which first link is pivotably attached to the recipient object for rotation about the first axis; and,
the second link having a third rotational joint defining a third link axis, and a fourth rotational joint defining a fourth link axis, the third and fourth link axes being at a second link angle to each other, the second link being pivotably attached to the first link such that the second and third link axes coincide, the second link being pivotably mounted at the fourth link axis to transfer a force from the force provider,
in which the first, second, third and fourth axes intersect at a predetermined point such that the recipient object can rotate about the predetermined point by articulation of the linkage;
in which the first and second link angles are each less than 45 degrees.

Advantageously, this gimbal-like mechanism allows forces to be applied by the force provider to the predetermined point. The recipient object can articulate the linkage to move about the predetermined point, but importantly the force remains acting through that point during articulation of the linkage. Therefore forces can be applied in a desired direction, and movement of the recipient object is permitted without distortion of the force, or production of undesirable torques. The use of small angle links (less than 45 degrees) allows for a reasonable range of movement whilst keeping the arrangement compact. Preferably the sum of the internal angles of the links should be less and 90 degrees for this reason. The angles may be selected to provide a limited range of motion as desired—for example to prevent over-articulation in the case of a rehabilitation robot.

Preferably the force provider is a push-pull rod driven by an actuator, such as a linear actuator or preferably a rotational actuator with a crank.

As mentioned, preferably the push-pull rod and the actuator are configured to exert a force through the predetermined point.

Preferably the rotational joints are defined by bores in the links having common shafts extending therethrough. This allows for simple assembly.

Preferably each link comprises a body having a mid section, a first end section and a second opposite end section, the end sections being angled with respect to the mid section. The rotational joints of the links may then be defined normal to respective end sections such that the sections are angled to provide the link angles.

Preferably the links are constructed from generally tubular bodies, e.g. extruded bodies. This makes them light.

The linkage may comprises a third link having a fifth rotational joint defining a fifth link axis, and a sixth rotational joint defining a sixth link axis, the fifth and sixth link axes being at a third link angle to each other, the third link being pivotably attached to the second link such that the second and third link axes coincide, the third link being pivotably mounted at the sixth link axis to transfer a force from the force provider. The linkage may comprise more than three links.

The invention also provides a rehabilitation apparatus comprising a linkage according to the first aspect, in which the recipient object is a support for a body part. For example for a leg, arm or torso.

Preferably the support for a body part is configured to receive a body part proximate a joint to as to align an axis of rotation of the joint with the predetermined point of the linkage. This keeps the point of action of the rehabilitation force on the joint.

More preferably the support for a body part is configured to receive a body part proximate a joint to as to align a centre of rotation of the joint with the predetermined point of the linkage.

The force provider may be configured to exert a force in a first direction, in which the first link axis is oriented at 80 to 100 degrees to the exerted force. Preferably it is oriented at 90 degrees.

Preferably the support is a foot support, and the force provider is configured to exert the force in a fore-aft direction of a subject in use. Preferably the first link is connected to the support at a lateral side of the subject's foot in use.

BRIEF DESCRIPTION OF THE DRAWING VIEWS

An example linkage in accordance with the present invention will now be described with reference to the accompanying figures, in which.

DETAILED DESCRIPTION OF THE INVENTION

Figure 1:
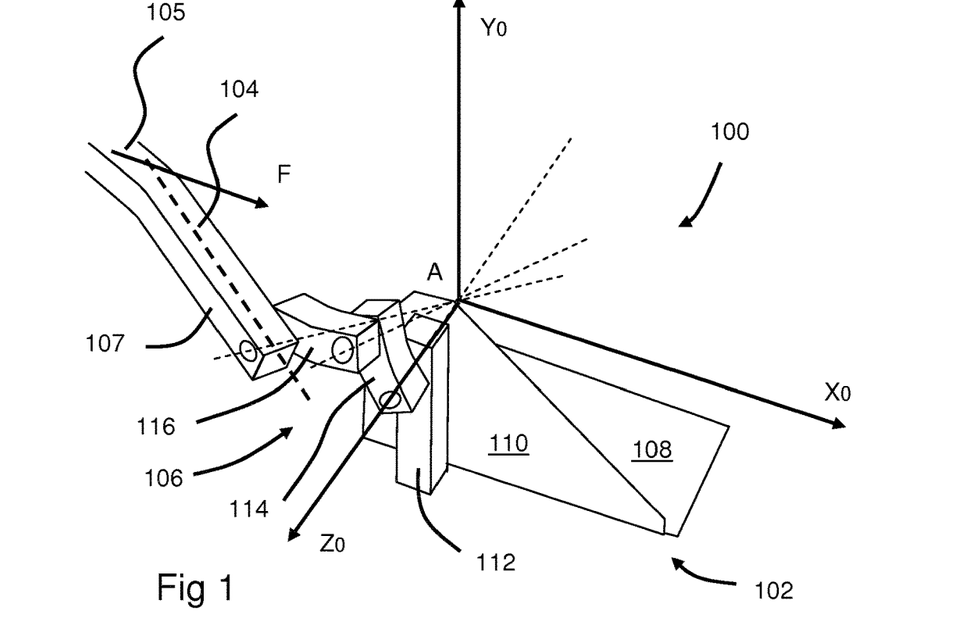
FIG. 1 is a perspective view of a part of a gait training apparatus comprising a first linkage in accordance with the present invention.

Referring to FIG. 1, there is shown a gait training assembly 100 comprising a foot brace 102, a push rod 104 and a linkage 106.

The foot brace 102 comprises a base plate 108 configured to support the underside of a human foot (not shown), and a side plate 110 extending perpendicularly and vertically therefrom to support the outer side of the foot. The side plate 110 comprises a support member 112 also extending vertically from the base plate 108 on the outer side of the side plate 110.

A global coordinate system is shown in FIG. 1 having axes X0, Y0, Z0. The foot brace 102 is arranged to hold a human foot with the centre of the ankle joint (modelled as a spherical joint for simplicity) A at the centre of the global coordinate system.

The pushrod 104 has a main portion 105 connected to an actuator (not shown) arranged to provide a force in direction F, which is generally parallel to X0. An end portion 107 of the pushrod 104 is at an angle α to the main portion 105 as shown in FIG. 3.

The linkage 106 comprises a first link 114 and a second link 116. The links 114, 116 in this embodiment are similar, and as such only the link 114 will be described here with reference to FIG. 2.

Figure 2:
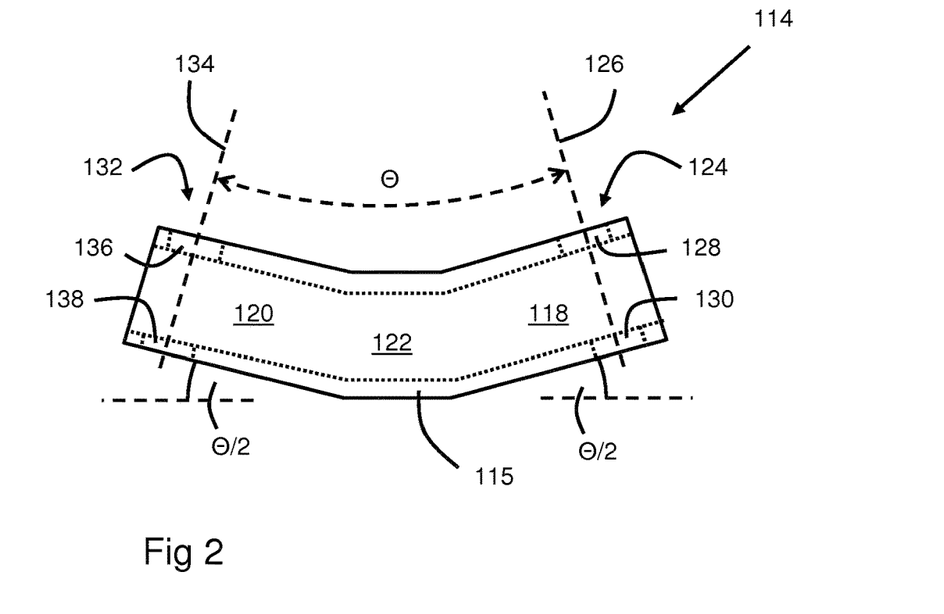
FIG. 2 is a detail view of a component of the linkage of FIG. 1.

The link 114 comprises a tubular, prismatic body 115 having a hollow square cross-section. The link defines a first end 124 and a second end 132. The body 115 comprises a first end portion 118, a second end portion 120 and a middle part 122 joining the first and second end portions 118, 120. A first pair of bores 128, 130 extend through the first end portion proximate the first end 124 of the body 115. The bores 128, 130 define a first axis 126 normal to the surfaces of the body 115 in which the bores 128, 130 are defined. Similarly a second pair of bores 136, 138 extend through the second end portion proximate the second end 132 of the body 115. The bores 136, 138 define a second axis 134 normal to the surfaces of the body 115 in which the bores 138, 136 are defined. The first and second end portions 118, 120 are angled to the middle part 122 at an angle $\Theta/2$ such that the axes 126, 134 are at an included angle of $\Theta$ to each other.

Figure 3:
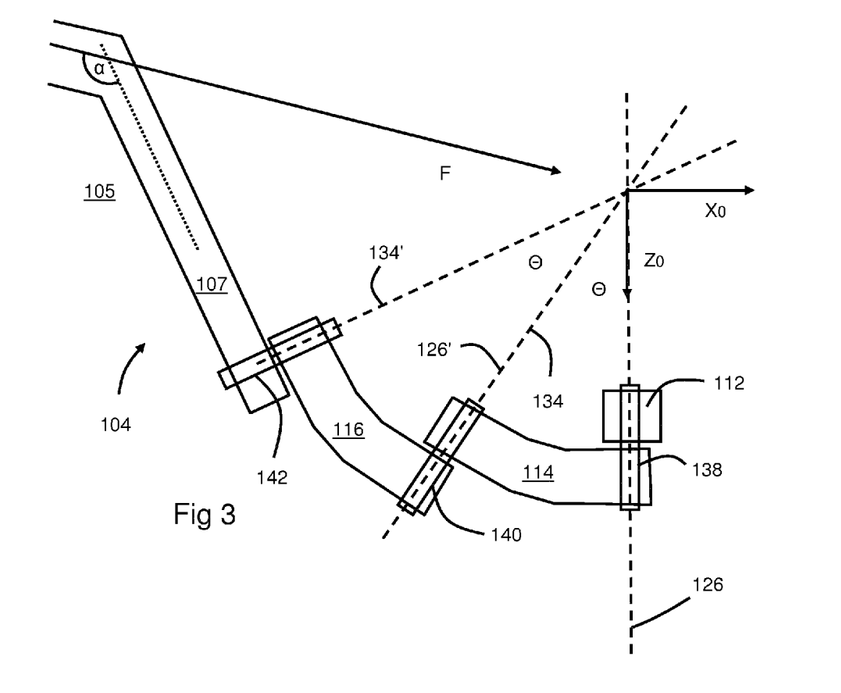
FIG. 3 is a perspective view of the linkage of FIG. 1.

Referring to FIG. 3, the first link 114 is connected to the support member 126 via a first rotational joint 138, which comprises a shaft engaged in the aligned bores 128, 130 of the link 114. The axis 126 of the first link 114 is aligned with the global axis Z0 such that the first link 114 can rotate relative to the foot brace 102.

The second link 116 is connected to the second end portion 120 of the first link 114 by a second rotational joint 140 which allows the first and second links 114, 116 to rotate relative to one another about the second axis 134 of the first link 114, and a first axis 126' of the second link 116, which are aligned.

The end portion 107 of the pushrod 104 is connected to the second link 116 by a third rotational joint 142 for rotation about a second axis 134' of the second link 116.

Figure 4:
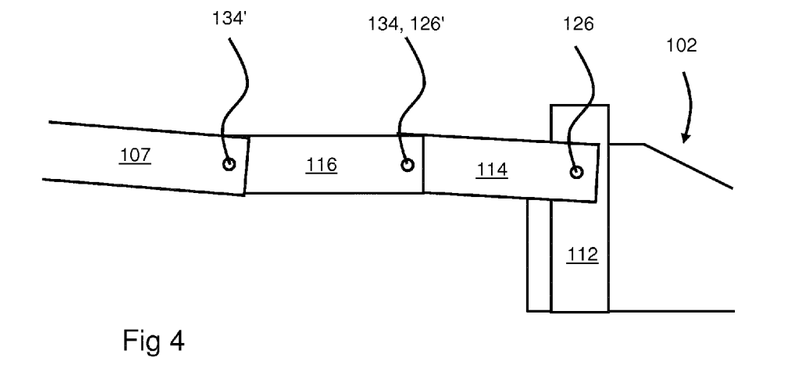
FIG. 4 is a side view of the linkage of FIG. 1.

In the configuration shown in FIGS. 3 and 4 (i.e. with the links in-line), the links 114, 116 span an angle of $2\Theta$ relative to the axis 126.

Figure 5A:
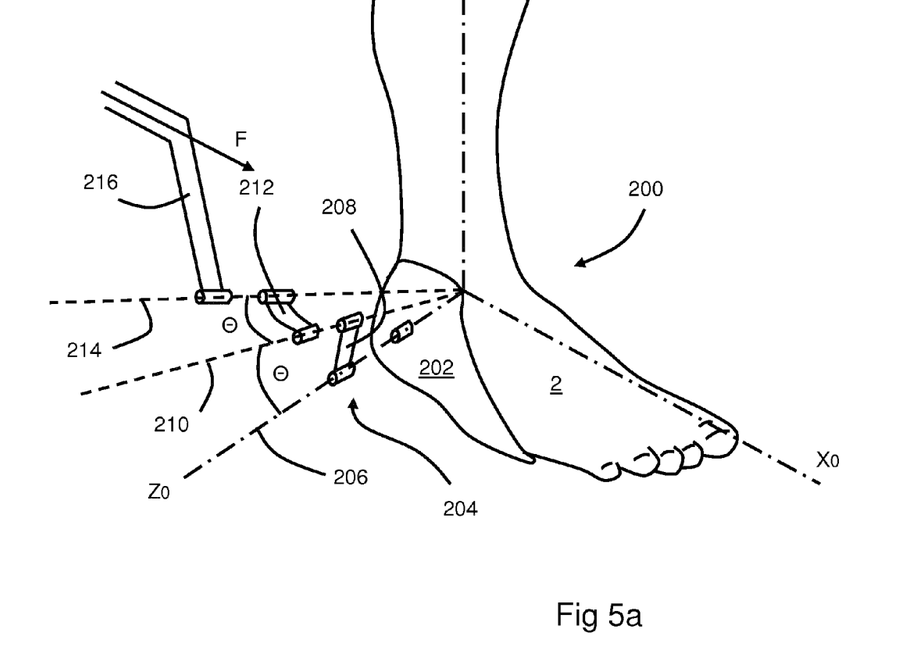
FIGS. 5a and 5b are schematic views of a second linkage in accordance with the present invention.
Figure 5B:
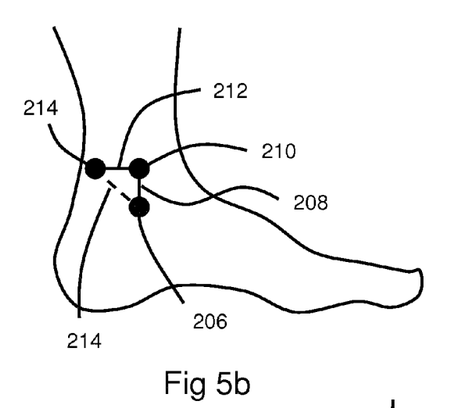

Referring to FIGS. 5a and 5b, a schematic representation of a second assembly 200, which works on the same principle as the first assembly 100. The assembly 200 comprises a foot brace 202 holding a human foot 2. The ankle joint of the human foot 2 is coincident with the global coordinate system X0, Y0, Z0 having an origin O.

A linkage 204 comprises a first joint connected to the foot brace 202 defining a first axis 206 (aligned with Z0 in FIGS. 5a and 5b). A first link 208 is connected to rotate about the first axis 206, and is connected to a second joint defining a second axis 210. A second link 212 is connected to rotate about the second axis 208 relative to the first link 208, and is connected to a third joint defining a third axis 214. The second link is thereby rotationally connected to a pushrod 216.

The axes 206, 210 and 214 intersect at a common point which is coincident with the origin O of the ankle. The links 208, 212 therefore form a gimbal-like mechanism permitting movement of the foot 2 in a controlled manner.

The foot 2 in FIGS. 5a and 5b is in a neutral, or static position, and as can be seen, force F when applied to the pushrod 216 in a direction generally aligned with X0 will urge the foot forwards via the brace 202. The pushrod 216 is configured such that the force F acts through the centre of rotation O of the ankle. Therefore the subject does not feel any torque on the ankle.

Figure 6A:
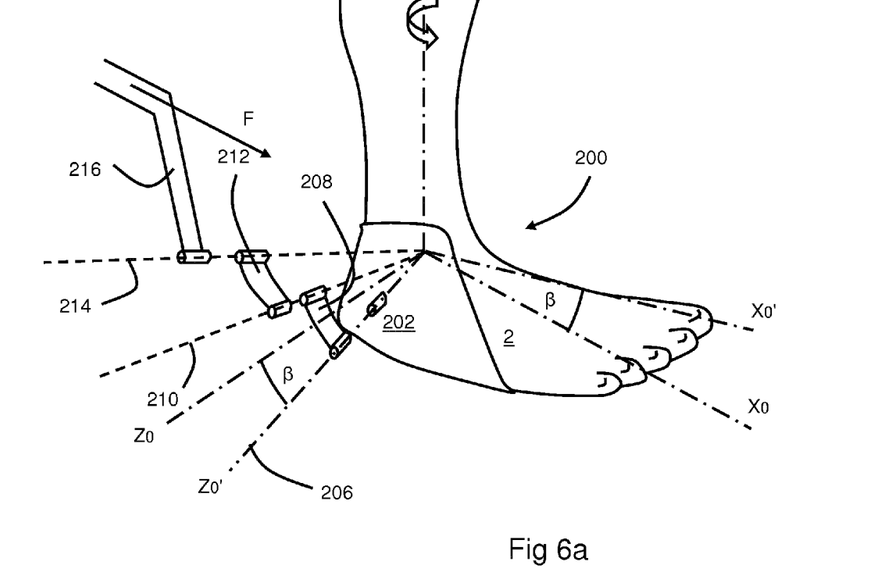
FIGS. 6a and 6b are schematic views of the linkage of FIGS. 5a and 5b in a second position.
Figure 6B:
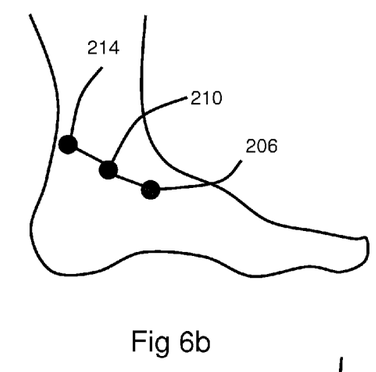

Turning to FIGS. 6a and 6b, the foot 2 has undergone an endorotation of β degrees about the vertical axis Y0, thus providing new foot axes X0', Z0' each of which are rotated by β degrees from the global axes X0, Z0.

Because of the constraint of the first joint defining axis 206 to the brace 202, the axis 206 rotates with the foot axis Z0' by β degrees. Although this is the case, articulation of the links 208, 212 means that the pushrod 216 (and therefore the axis 214) remains in the same position. Therefore the force F can still be applied in the same direction, through the origin O of the ankle joint. This allows the foot to undergo exorotation and endorotation whilst the rehabilitation is taking place. During walking, the subject ankle undergoes a few degrees of endo-exorotation (this is normal). By allowing this rotation, gait is allowed to occur naturally without unnecessary restriction on this movement. There is the possibility to apply corrective forces on the ankle, e.g. increase step length or to place the foot more outward, without applying endo exorotation. Exo- and endo-rotation does not result in any forces being applied which are not coincident with the origin O of the ankle. In particular, no forces which oppose movement of the ankle back to the neutral position shown in FIGS. 5a and 5b are applied.

It will be noted that the range of movement of the mechanism is limited by the included angles Θ of the links 208, 212.

Figure 7A:
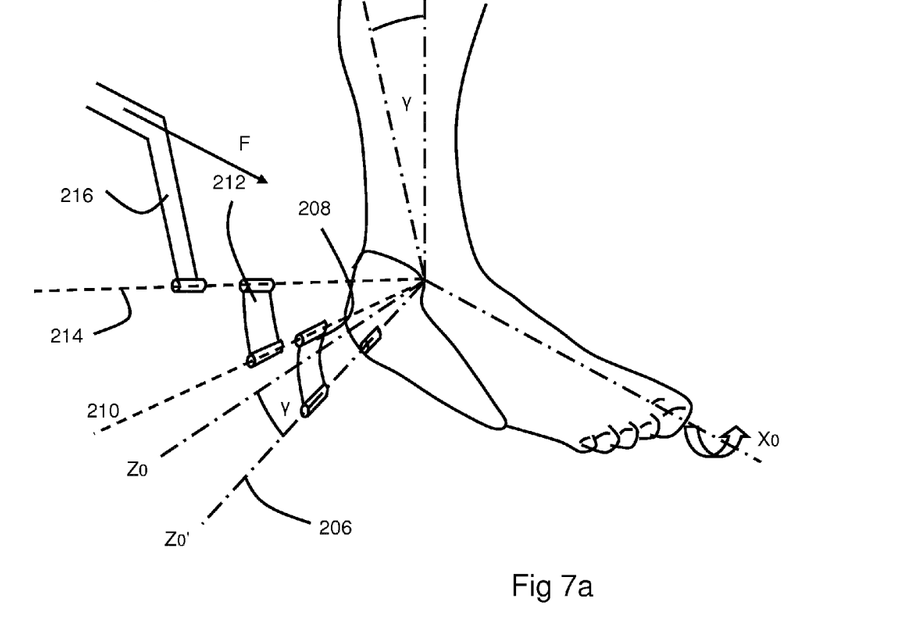
FIGS. 7a and 7b are schematic views of the linkage of FIGS. 5a and 5b in a third position.
Figure 7B:
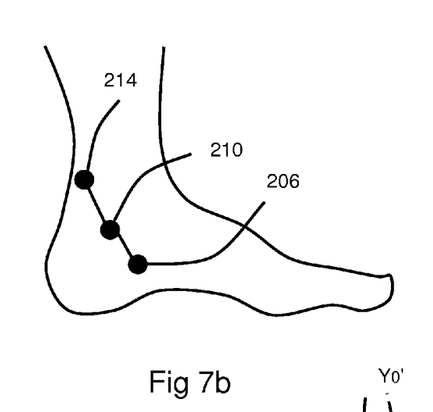

Turning to 7a and 7b, the foot 2 has undergone an inversion of γ degrees about the horizontal axis X0, thus providing new foot axes Y0', Z0' each of which are rotated by γ degrees from the global axes Y0, Z0.

Because of the constraint of the first joint defining axis 206 to the brace 202, the axis 206 rotates with the foot axis Z0' by γ degrees. Although this is the case, articulation of the links 208, 212 means that the pushrod 216 (and therefore the axis 214) remains in the same position. Therefore the force F can still be applied in the same direction, through the origin O of the ankle joint. This allows the foot to undergo inversion and eversion whilst the rehabilitation is taking place. Inversion and eversion does not result in any forces being applied which are not coincident with the origin O of the ankle. In particular, no forces which oppose movement of the ankle back to the neutral position shown in FIGS. 5a and 5b are applied.

Again, it will be noted that the range of movement of the mechanism is limited by the included angles Θ of the links 208, 212.

As seen in the Figures, the point on at which the first link 208 is attached to the brace 202, is on the side of the foot (as opposed to the force F, which is applied from the rear of the foot towards the front). As such, the axis 206 of the attachment of the linkage 204 to the brace 202 is at 90 degrees to the direction of the applied force F. Therefore the included angle Θ is less than 45 degrees (and is 17 degrees in this example). This provides a reasonable degree of movement of the foot 2, whilst ensuring that the linkage 204 is compact.

During rehabilitation, it is desirable to provide 25 degrees of dorsiflexion, and 35 degrees of plantarflexion (rotation about Z0). Due to this significant range of motion required, the first axis (which is highly unconstrained) is aligned to the ankle flexion axis (i.e. the first link is positioned at the side of the foot).

Figure 8:
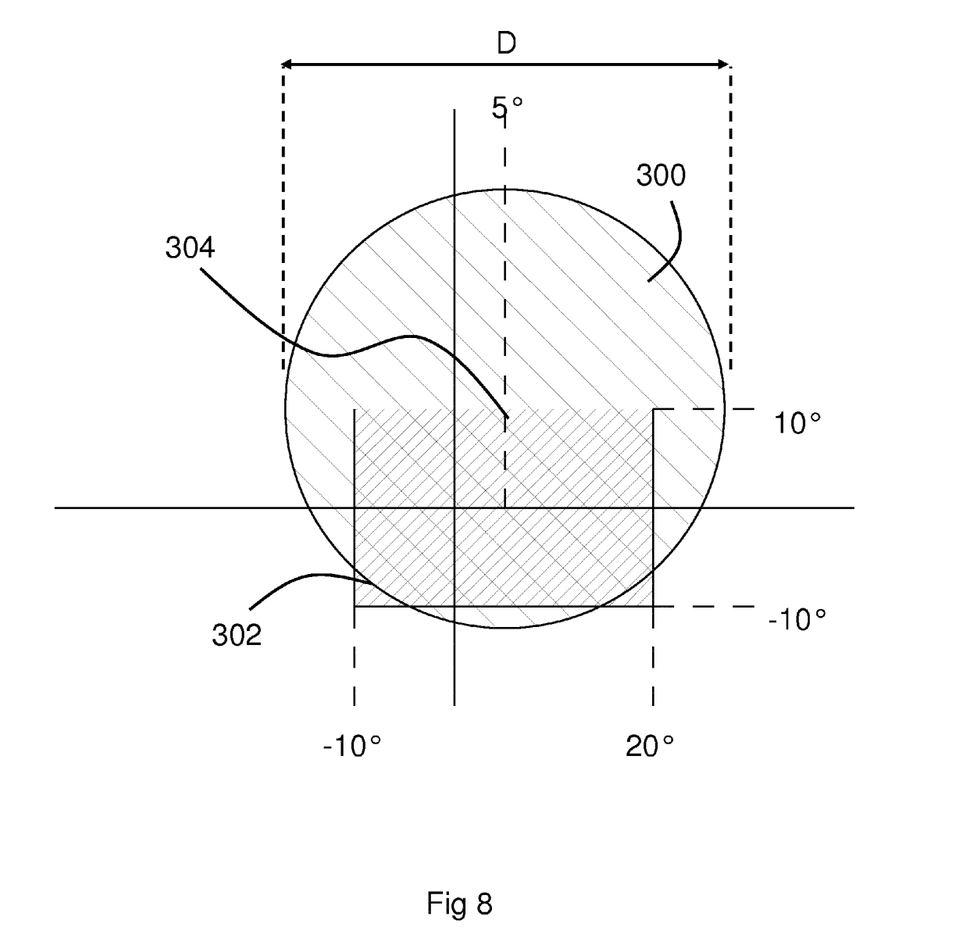
FIG. 8 is a diagram of the workspace and range of motion of a gait rehabilitation robot for the ankle degree of freedom.

Turning to FIG. 8, the required range of motion for an ankle support is shown (for inversion/eversion and endo/exo rotation). Endo/exo rotation is shown on the horizontal axis, and inversion/eversion on the vertical axis.

The circular area 300 represents the range of motion provided by a linkage having two links each with Θ=12 degrees. The circle has a diameter D of 24 degrees—i.e. 2Θ. This means that a potential range of 24 degrees in either degree of freedom is possible.

10 degrees of ankle inversion and eversion (i.e. rotation about a horizontal fore-aft axis) are also desirable. It is desirable to provide a hard limit for inversion to avoid injury (the most common type of ankle sprains arise from inversion).

10 degrees of endorotation and 20 degrees of exorotation are also required for normal gait.

The required workspace 302 is also shown (as defined by the range of motion above). It is rectangular because the range of angular motion is specified by the design and geometry of the linkage. The workspace is a two-dimensional area because it is possible to undergo two types of motion simultaneously (because the ankle is effectively a ball joint).

By configuring the linkage appropriately, a centre 304 of the circular workspace 300 can be moved such that it is at 5 degrees exorotation (i.e. the mid-point of the exo-endo rotation range), and 10 degrees inversion. Usefully, this positions almost all of the required workspace 302 within the range of motion of the linkage, and also provides a hard limit of around −10 degrees inversion (although in reality this is dependent upon simultaneous endo/exo rotation).

The centre of the circle in FIG. 8 is the position of the links at which the axes 206 and 214 coincide. This can be determined by appropriate mechanical set up of the link axes during manufacture and assembly.

Figure 9:
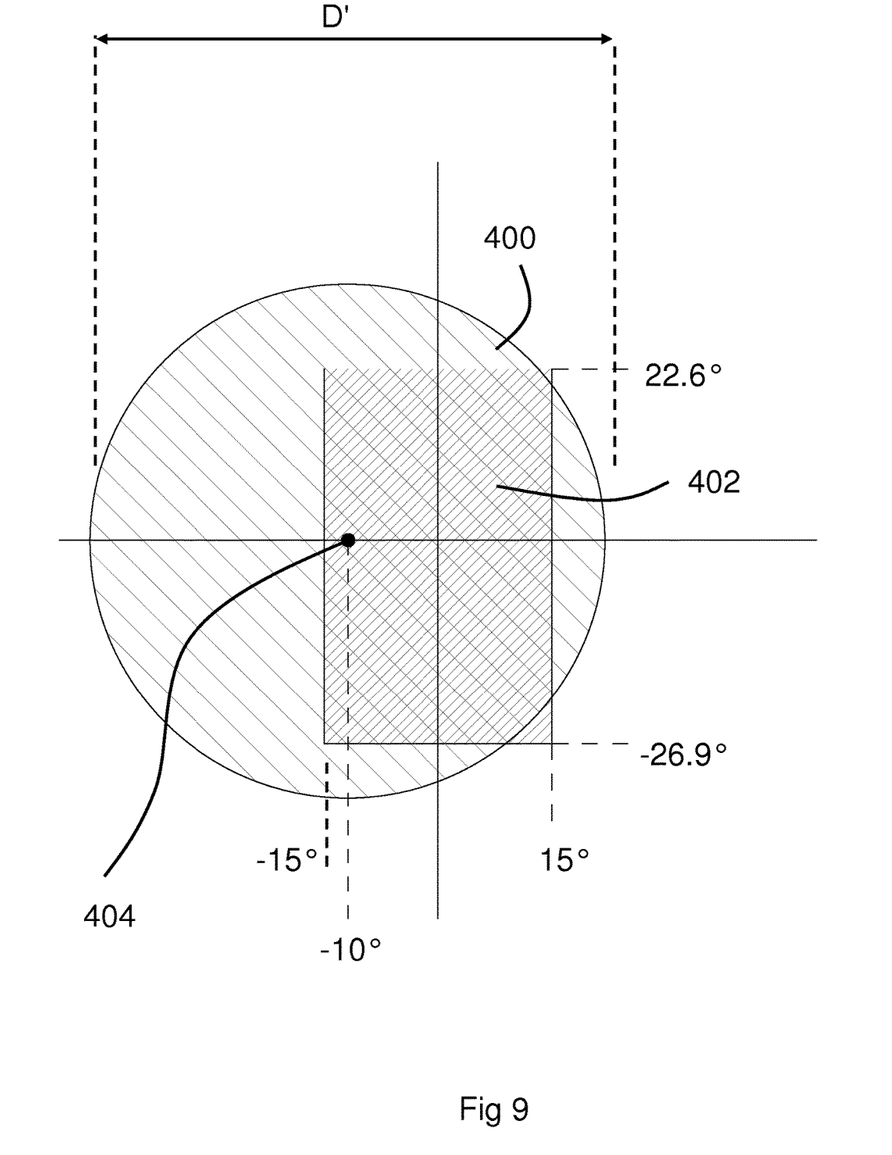
FIG. 9 is a diagram of the workspace and range of motion of a gait rehabilitation robot for the torso degree of freedom.

A similar example is shown in FIG. 9 for the human torso. In this instance, the linkage is attached with its virtual centre on the hip joint. Two linkages may be used—one centred on each hip joint to provide full freedom of movement (this is described in more detail with reference to FIG. 10 below). The present invention is particularly advantageous because forces should be applied into the hip joint without producing torques on the pelvis.

In FIG. 9, the range of motion of the linkage is shown as area 400. Pelvis axial rotation is represented on the horizontal axis, and pelvis sagittal rotation on the vertical axis. With two links having Θ=17 degrees, the diameter D' is 34 degrees.

The desired degrees of freedom required by the pelvis during gait are as follows:
(i) rotation of the pelvis in the frontal plane about a fore-aft axis (frontal rotation);
(ii) rotation of the pelvis in the horizontal, transverse plane about a vertical axis (axial rotation); and
(iii) rotation of the pelvis in the sagittal plane about a left-right axis (sagittal rotation).

The linkage is positioned behind the patient—at the side of the patient there is no available space, since in gait the subject's arms must be able to swing.

The range of motion required by the pelvis is as follows:
Frontal rotation=±10 degrees;
Axial rotation=±15 degrees;
Sagittal rotation=−26.9 to 22.6 degrees.
The above range provides a required workspace 402.

The linkage is assembled such that the axis equivalent to Z0 is aligned with the frontal axis of rotation (i.e. in a fore-aft direction), and positioned at the rear of the subject. In effect, the linkage does not therefore limit pure frontal rotation. This is not problematic, as during gait excessive frontal rotation is not a problem (it would be very difficult to achieve).

As mentioned above, ±15 degrees axial rotation is required, and as such the minimum link angle (for two links) Θ=15/2=7.5 degrees.

One minor drawback of the linkage is that the centre point (the origin of the circle in FIG. 9) creates a slightly distracting sensation for the subject, and therefore it would not be desirable to have this in the "normal" range of motion. As such, it is offset by 10 degrees in axial rotation.

From the circle centre 404, the angle Θ is selected so that the circle 400 covers the required workspace 400. In this case Θ=17 degrees.

Figure 10:
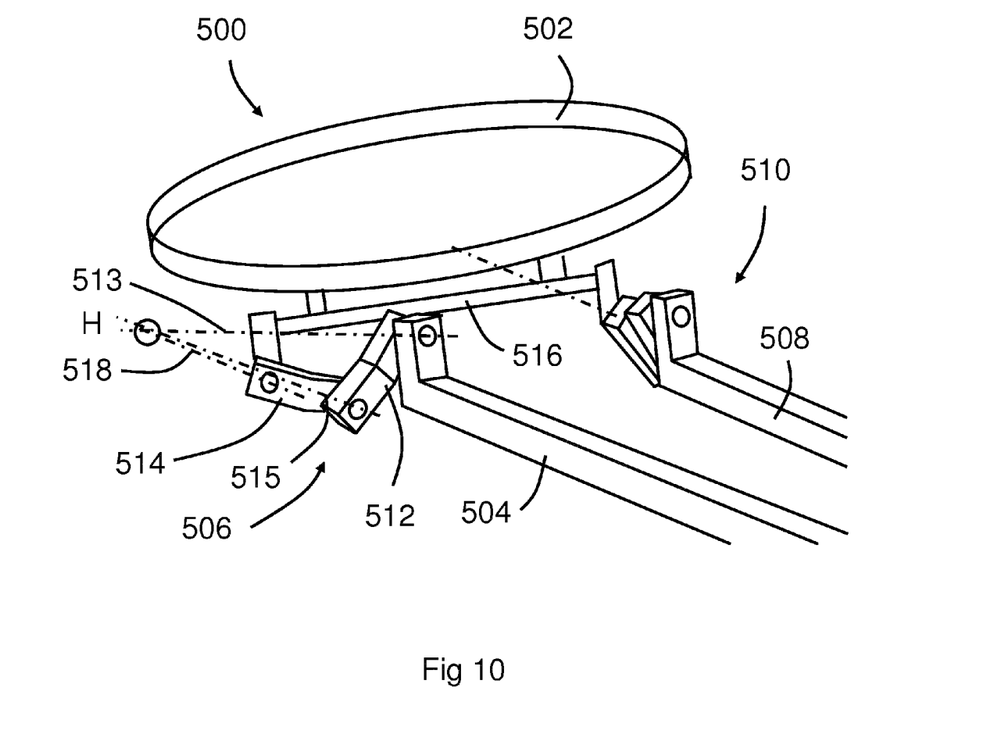
FIG. 10 is a schematic perspective view of a further part of a gait training apparatus comprising a third linkage in accordance with the present invention.

Turning to FIG. 10, there is shown a gait training assembly 500 comprising a waist band 502, a first push rod 504, a first linkage 506, a second push rod 508 and a second linkage 510.

The waist band is configured to surround the abdomen of a subject to affix the linkages 506, 510 at the rear of the respective left and right hips.

The first linkage 506 comprises a first link 512 pivotably attached to the first push rod 504 about an axis 513 and a second link 514 pivotably attached to the first link 512 for rotation about an axis 515. The second link 514 is also pivotably attached to a bracket 516 downwardly depending from the waist band 502 for rotation about an axis 518.

Each link 512, 514 has an included angle of Θ between its respective axes of rotation, as with previous embodiments. All the axes 513, 515, 518 intersect at a hip joint centre of rotation H, and the assembly 500 is configured such that this imaginary intersection point is aligned with the subject's hip.

The second linkage 510 is configured in substantially the same way as the first linkage 506.

Variations fall within the scope of the present invention.

For example, more than two links may be provided for extra range of movement. The eventual number of links must be chosen for the specific application, as although an increased number of links would provide a more fluid motion, the stiffness of the linkage is decreased.

Another variation is a simple arrangement that points to the centre of mass of the pelvis—between the hips (instead of at each hip joint). With this setup you can apply forces to the centre mass without applying distracting torques on the subject.

The present invention can be used to apply forces to other joints, providing the axes are aligned to intersect at the centre of rotation of the subject's joint.

What is claimed is:

1. A rehabilitation apparatus comprising:
   a force provider;
   a recipient object, wherein the recipient object is a body part support; and
   a linkage configured to transfer a force from the force provider to the recipient object, the linkage comprising a first link and a second link;
   the first link having a first rotational joint defining a first link axis, and a second rotational joint defining a second link axis, the first and second link axes being at a first link angle to each other, which first link is pivotably attached to the recipient object for rotation about the first axis; and,
   the second link having a third rotational joint defining a third link axis, and a fourth rotational joint defining a fourth link axis, the third and fourth link axes being at a second link angle to each other, the second link being pivotably attached to the first link such that the second and third link axes coincide, the second link being pivotably mounted at the fourth link axis to transfer a force from the force provider,
   in which the first, second, third and fourth axes intersect at a predetermined point such that the recipient object can rotate about the predetermined point by articulation of the linkage;
   in which the first and second link angles are each less than 45 degrees; and
   in which the body part support is a foot support, and the force provider is configured to exert the force in a fore-aft direction of a subject's foot in use.

2. A rehabilitation apparatus according to claim 1, in which the body part support is configured to receive a body part proximate a joint so as to align an axis of rotation of the joint with the predetermined point of the linkage.

3. A rehabilitation apparatus according to claim 2, in which the body part support is configured to receive the body part proximate the joint so as to align a centre of rotation of the joint with the predetermined point of the linkage.

4. A rehabilitation apparatus according to claim 2, in which the push-pull rod and the actuator are configured to exert a force through the predetermined point.

5. A rehabilitation apparatus according to claim 1, in which the force provider is configured to exert a force in a first direction, and in which the first link axis is oriented at 80 to 100 degrees to the exerted force.

6. A rehabilitation apparatus according to claim 1, in which the first link is connected to the body part support at a lateral side of the subject's foot in use.

7. A rehabilitation apparatus according to claim 1, in which the force provider is a push-pull rod driven by an actuator.

8. A rehabilitation apparatus according to claim 1, in which each rotational joint is defined by respective bores in the links and a shaft extending through the respective bores.

9. A rehabilitation apparatus according to claim 1, in which each link comprises a body having a mid section, a first end section and a second opposite end section, the end sections being angled with respect to the mid section.

10. A rehabilitation apparatus according to claim 9, in which the rotational joints of the links are defined normal to respective end sections such that the sections are angled to provide the link angles.

11. A rehabilitation apparatus according to claim 1, in which the links are constructed from generally tubular bodies.

* * * * *